(12) United States Patent
Laberteaux et al.

(10) Patent No.: US 7,934,095 B2
(45) Date of Patent: Apr. 26, 2011

(54) METHOD FOR EXCHANGING MESSAGES AND VERIFYING THE AUTHENTICITY OF THE MESSAGES IN AN AD HOC NETWORK

(75) Inventors: Kenneth P. Laberteaux, Ann Arbor, MI (US); Yih-Chun Hu, Urbana, IL (US)

(73) Assignees: Toyota Motor Engineering & Manufacturing North America, Inc., Erlanger, KY (US); The Board of Trustees, University of Illinois at Urbana-Champaign, Champaign, IL (US)

( * ) Notice: Subject to any disclaimer, the term of this patent is extended or adjusted under 35 U.S.C. 154(b) by 692 days.

(21) Appl. No.: 11/936,509

(22) Filed: Nov. 7, 2007

(65) Prior Publication Data

US 2008/0235509 A1    Sep. 25, 2008

Related U.S. Application Data

(60) Provisional application No. 60/865,246, filed on Nov. 10, 2006, provisional application No. 60/891,385, filed on Feb. 23, 2007.

(51) Int. Cl.
*H04L 9/32* (2006.01)
(52) U.S. Cl. ...................................... 713/169
(58) Field of Classification Search .................. 713/156, 713/158, 169; 380/270, 282, 283
See application file for complete search history.

(56) References Cited

U.S. PATENT DOCUMENTS

| | | | |
|---|---|---|---|
| 5,432,841 A | 7/1995 | Rimer et al. | |
| 6,430,485 B1 | 8/2002 | Hullinger | |
| 6,680,922 B1 | 1/2004 | Jorgensen | |
| 6,701,434 B1 | 3/2004 | Rohatgi | |
| 6,708,107 B2 | 3/2004 | Impson et al. | |
| 6,748,320 B2 | 6/2004 | Jones | |
| 6,760,662 B2 | 7/2004 | Lee et al. | |

(Continued)

FOREIGN PATENT DOCUMENTS

WO    WO-2006052943    5/2006

OTHER PUBLICATIONS

Bohge et al, TESLA Certificates: An authentication Tool for Networks of Compute-Constrainined Devices, 5 pages, ACM, Aug. 2003.*

(Continued)

*Primary Examiner* — Ellen Tran
(74) *Attorney, Agent, or Firm* — Gifford, Krass, Sprinkle, Anderson & Citkowski, P.C.

(57) ABSTRACT

A method for exchanging messages containing reliable information between nodes in an ad hoc network, such as a vehicle ad hoc network. The method includes the steps of providing a public key for a PKI encrypted certificate authority signature to all nodes known to transmit reliable information. Each node transmits a signal containing node identification information and the PKI encrypted certificate authority signature associated with that node. Each node also receives like signals from other nodes and then decrypts the certificate authority signatures from the received signals by using the certificate authority public key to ascertain the authenticity of the received certificate authority signatures and the reliability of the received message. Thereafter, the nodes receive and accept messages with a TESLA encrypted signature only with nodes identified to have authentic certificate authority signatures until the occurrence of a subsequent predefined event, such as a new node in the network or the elapse of a predetermined time period.

17 Claims, 3 Drawing Sheets

U.S. PATENT DOCUMENTS

| | | | |
|---|---|---|---|
| 6,920,556 | B2 | 7/2005 | Kuehr-McLaren et al. |
| 7,006,437 | B2 | 2/2006 | Ogier et al. |
| 7,143,296 | B2 | 11/2006 | Hirata et al. |
| 7,155,238 | B2 | 12/2006 | Katz et al. |
| 2003/0069784 | A1 | 4/2003 | Banerjee et al. |
| 2003/0187570 | A1 | 10/2003 | Impson et al. |
| 2004/0003229 | A1 | 1/2004 | Reinold et al. |
| 2004/0015689 | A1* | 1/2004 | Billhartz ............ 713/156 |
| 2004/0215373 | A1 | 10/2004 | Won et al. |
| 2005/0265256 | A1 | 12/2005 | Delaney |
| 2006/0291482 | A1 | 12/2006 | Evans |
| 2007/0223702 | A1* | 9/2007 | Tengler et al. ............ 380/270 |

OTHER PUBLICATIONS

Perrig et al., The TESLA Broadcast Authentication Protocol, 11 pages CryptoBytest, 5:2 Summer/Fall 2002.*

Song et al., A Framework of Secure Location Service for Postition-based Ad hoc Routing, 8 pages, The University of British Columbia Oct. 7, 2004.*

TESLA History 2010, published by TESLA in 2010, 1 page.*

Bohge at al., TESLA Certificates: An Authentication Tool for Networks of Compute-Constrained Devices, 5 pages, Aug. 2003.

Ferryanto et al., Pareto-optimal and Robust Solutions Based on Axiomatic Design Principles, Ford Technical Journal, vol. 6, No. 2, Mar. 14, 2003, 20 pages.

Perrig et al., The TESLA Broadcast Authenlcation Protocol, 11 pages, Summer/Fall 2002.

Perrig at al,, TESLA: Multicast Source Authentication Transform Introduction, www.ece.cmu.edu/~adrian/tesla/draft-ietf-msec-tesla-intro-03.txt., 14 pages, Jan. 13, 2008.

* cited by examiner

| VIN | Node Public Key | CA Signature |
|---|---|---|

$$K_0 \xleftarrow{F} K_1 \cdots\cdots K_{N-2} \xleftarrow{F} K_{N-1} \xleftarrow{F} K_N$$

METHOD FOR EXCHANGING MESSAGES AND VERIFYING THE AUTHENTICITY OF THE MESSAGES IN AN AD HOC NETWORK

CROSS-REFERENCE TO RELATED APPLICATIONS

This application claims priority of U.S. Provisional Patent Application Ser. No. 60/865,246 filed Nov. 10, 2006, and Ser. No. 60/891,385 filed Feb. 23, 2007, which are incorporated herein by reference.

BACKGROUND OF THE INVENTION

I. Field of the Invention

The present invention relates to a method for exchanging reliable information between nodes in an ad hoc network.

II. Description of Related Art

On an average day, hundreds of people are killed and thousands injured in automotive accidents. This, in turn, results in a huge expenditure of health care dollars for treating those injured in such automotive accidents.

Many automotive accidents, however, are preventable if the vehicle driver is warned of a hazardous driving condition, or the vehicle itself reacts automatically to such a hazardous condition. For example, a driver may cause a chain reaction accident by rapidly applying his or her brakes in order to avoid collision with a deer or other animal. The drivers behind the vehicle about to strike the animal, however, are unable to brake sufficiently rapidly in order to avoid an accident thus resulting in a chain reaction accident. However, such an accident may be theoretically prevented, or at least the injuries and/or damages minimized, if the driver and/or vehicle potentially involved in the accident are able to react sufficiently rapidly to hazardous driving conditions in the vicinity.

For that reason, dedicated short range communications (DSRC) have been proposed to permit communication between automotive vehicles as well as vehicles and infrastructure for safety communications. Indeed, the federal government in the United States has allotted 75 MHz of the wireless spectrum in the 5.9 GHz range for such communications.

In managing the wireless communication between different vehicles, as well as between vehicles and infrastructure, authentication that the messages received by any particular automotive vehicle are trustworthy and constitute reliable information is paramount. Without such authentication, the vehicles may receive wireless communication from parties who intentionally transmit incorrect information for whatever private purpose, as well as vehicles that, through malfunction, transmit incorrect information. Without authentication of the reliability of the received messages, unsafe traffic conditions, traffic congestion, etc. may result.

In order to enable automotive vehicles to communicate between themselves and optionally infrastructure, it has been previously proposed to form a vehicle ad hoc network (VA-NET) with the automotive vehicles that are within the range of interest for the automotive vehicle. Such vehicles would then communicate amongst themselves within the network providing safety information, such as the status or status of operation of each vehicle in the network as well as infrastructure adjacent the road.

In order to ensure the authenticity of the messages received within the network, it has been previously proposed to use public key infrastructure (PKI) encryption of the messages transmitted over the network. In such a PKI encryption system, a certificate authority, such as a governmental body, distributes a public key to all the vehicles or nodes within the network. The certificate authority then also provides a signature encrypted with a private key to each node or vehicle and in which the signature is unique to that particular vehicle. For example, the PKI encrypted certificate authority signature may be bound to the vehicle identification number (VIN), license plate, and/or the like. The certificate authority may also revoke the encrypted signature for any particular vehicle if it is determined that that vehicle no longer transmits trustworthy or reliable information.

In practice, the vehicles in the node transmit a message, which includes not only the vehicle identification but potentially safety information, together with the encrypted certificate authority signature. Upon receipt of that message by another vehicle, the other vehicle utilizes the public key of the certificate authority to decrypt the received certificate authority signature. That decrypted signature is then compared to a result of a hash function applied to the received message. If a match results, both the accuracy of the message is authenticated as well as the signature of the signature certificate authority thus verifying that the information received is valid. Otherwise, the received message is discarded and ignored.

The certificate authority, of course, retains the ability to revoke its encrypted certificate authority signature from any particular vehicle at any time in the event that that vehicle begins to transmit unreliable information.

While the PKI encryption method for authenticating received messages in an ad hoc network provides sufficient security for the authenticity of the messages received in the ad hoc network, the security certificate authority signature which accompanies the messages transmitted in the network is several times the size of the actual message itself. This, together with the repetitive description of the certificate authority signature for each message, results in higher computational cost and bandwidth requirements, particularly where there are numerous vehicles in the ad hoc network.

SUMMARY OF THE PRESENT INVENTION

The present invention provides a security authentication process for an ad hoc network, such as a vehicle ad hoc network, which overcomes the disadvantages of the previously known proposals for such networks.

In brief, as each new node is detected in the ad hoc network, the nodes in the network exchange identification and authentication information utilizing PKI encryption. As such, each node transmits the vehicle information, such as the VIN and the node public key, as well as the certificate authority signature which preferably constitutes the hash function result of the VIN concatenated with the node public key encrypted with the certificate authority private key. The receiving node then decrypts the certificate authority signature with the certificate authority public key and compares the result with the hash function result of the received VIN concatenated with the node public key. Unless a match is obtained, the entire message is disregarded. Otherwise, the receiving node caches the identity of the new node as authentic so that any message received from the new authenticated node is regarded as reliable information.

The future exchange of messages or communication between the two nodes, following authentication of each node, is then conducted using Timed Efficient Stream Loss tolerant Authentication (TESLA) encryption. Initially a TESLA certificate is transmitted which comprises the TESLA parameters, the root $K_0$ of a randomly derived hash chain and the TESLA signature which, in turn, consists of the hash function result of the TESLA parameters concatenated with the current hash function result $K_n$ encrypted with the node private key. Thereafter, information is exchanged by appending a TESLA signature to each message until the hash chain is exhausted.

Upon receipt of each message together with the TESLA signature, the receiving node caches both the message and the TESLA signature. Upon receipt of the next TESLA message and signature which contains $K_{n+1}$, i.e. the next key or hash function in the hash chain, the receiving node uses $K_{n+1}$, to decrypt the signature and compare the result with the hash function result of the received message. If a match occurs, the message is authenticated. Otherwise it is discarded. In either event, the hash result $K_n$ is then released and cannot be again used, at least not for a long time.

Since the keys or passwords utilized in the TESLA encryption exist for only a brief period of time before they are released, relatively short encryption keys may be used without breach of security. This, in turn, results in a much more efficient use of the available bandwidth, particularly when the ad hoc network contains many nodes, as well as greatly reduced computational requirements. Indeed, the only disadvantage of the TESLA encryption is that a slight time delay occurs between the receipt of the message and the time it may be decrypted.

Communication between the nodes continues until the occurrence of a predetermined event. For example, such a predetermined event may arise when a new node enters the network. When that happens, the certificate authority certificate is exchanged with the newly arriving node and, after authentication of the validity of the new node, communication resumes using TESLA encryption.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figures 1, 2, 3:
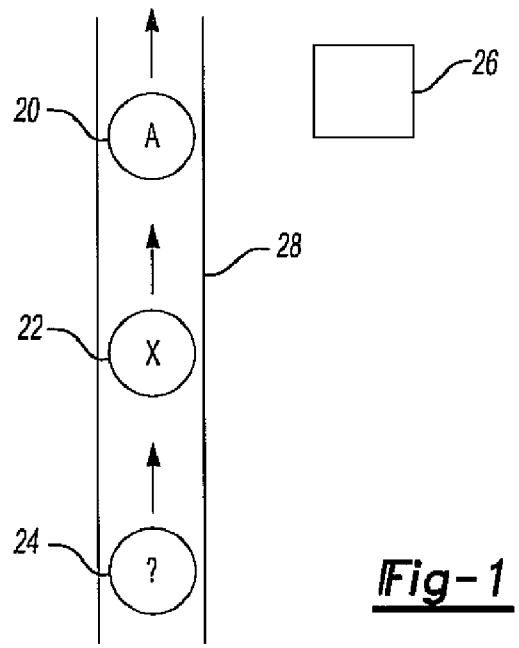
FIG. 1 is a diagrammatic view illustrating an ad hoc network.
FIG. 2 is a view illustrating the structure of a data packet using PKI encryption for the signature.
FIG. 3 is a diagrammatic view illustrating a hash function used in TESLA encryption.

With reference first to FIG. 1, two automotive vehicles 20 and 22 are there illustrated diagrammatically. Each vehicle 20 and 22, furthermore, is equipped with dedicated short range communication (DSRC) equipment to enable wireless communication between the vehicles 20 and 22. At present, such wireless communication is permitted in the United States in the 5.9 GHz band. Specifically, the United States federal government has provided 7 channels, each 10 MHz in bandwidth, beginning at 5.9 GHz.

In a fashion that will be subsequently described in greater detail, the vehicles 20 and 22 form a vehicular ad hoc network having two nodes, namely the vehicle 20 and the vehicle 22.

In the event that a third vehicle 24 enters a range of interest of the vehicles 20 and 22, i.e. the vehicle 24 is sufficiently close to the other vehicles 20 and 22 that the action of the vehicle 24 may impact on the safety of the vehicles 20 and/or 22, the vehicle 24 also becomes part of the ad hoc network. The ad hoc network may also include infrastructure information providers or servers 26 adjacent the road 28 on which the vehicles 20-24 travel.

Short range wireless communication between the vehicles 20-24 serves several purposes. Of these, safety applications are considered to be the most important. For example, if the vehicle 20 were to rapidly apply its brakes, the transmission of that information to the vehicles 22 and 24 may be sufficient to avert a rear-end collision between either the vehicles 20 and 22 or the vehicles 22 and 24.

Such wireless communication between the vehicles 20 and 24 and an adjacent server 26 may also be used for commercial purposes. For example, the vehicles 20-24 may utilize the server 26 to make certain purchases while traveling.

In either event, the information transmitted by any of the vehicles 20-24 or the roadside server 26 should be authenticated as reliable information. Otherwise, transmission of erroneous information by any of the vehicles 20-24 or the roadside server 26, either intentionally or through equipment malfunction, may create chaos on the road 28 and actually increase the safety risk, rather than reduce it. Such authentication also deters subsequent reproduction of commercial transactions.

In order to provide both security and authentication, a public key infrastructure (PKI) encryption method is employed. In a PKI encryption method, each node or vehicle is assigned both a public key and a private key. The node possesses the private key whereas the verifiers, i.e. the other nodes in the network, have access only to the public key. Knowing the private key allows the node to generate valid signatures and these signatures are then subsequently verified by using the public key. However, it is computationally infeasible to generate a valid signature with the public key alone.

In order to ensure that the public key belongs to the node being authenticated, PKI is employed so that a certificate authority signs or encrypts bindings or certificates between the public keys and the node identifiers, such as the Vehicle Identification Number (VIN). The certificate authority may, for example, be a government authority, its proxy or delegate and will freely distribute the public key for the certificate authority to all nodes that are in the ad hoc network or may become in the ad hoc network. Specifically, the certificate authority signature for an individual node is created by first calculating a hash function such as MD5 or SHA-1, of the node identifier concatenated with the node public key. That result is then encrypted with the certificate authority private key to form the certificate authority signature and an exemplary data packet is shown in FIG. 2.

Prior to describing the actual operation of the present invention, the present invention also utilizes timed efficient stream loss tolerant authentication (TESLA) as a part of the communication scheme between the nodes or vehicles 20-24. TESLA authentication, however, is only employed after the trustworthiness of the node has been authenticated by PKI decryption of the certificate authority signature.

Figure 6:
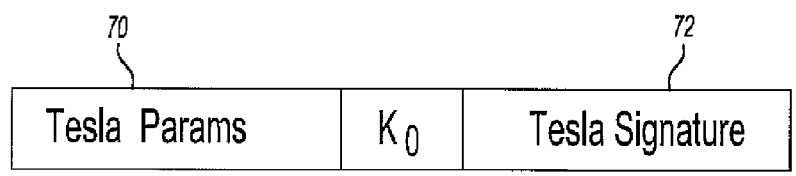
FIG. 6 illustrates an exemplary TESLA certificate.

First, a TESLA certificate must be exchanged between the nodes to verify that the subsequent TESLA messages are authentic. An exemplary TESLA certificate or data packet is shown in FIG. 6 and comprises TESLA parameters 70, e.g. timing parameters, the root $K_0$ of a hash chain (discussed below) and the TESLA node signature 72. Preferably the TESLA node signature 72 is formed by concatenating the TESLA parameters 70 with the hash chain root $K_0$, encrypting the result with a hash function and then signing the result with the private key for the node. In this fashion the TESLA signature is unique for each node.

With reference now to FIG. 3, in order to utilize TESLA encryption, a random number $K_N$ is selected where N is an arbitrary number, e.g. 2000, which defines the length of the hash chain, as well as a public one-way hash function F where $K_i=F(K_i+1)$. A hash chain is formed by applying the function F from $K_N$ successively until the root $K_0$ is calculated. An exemplary hash chain shown in FIG. 3 is then used for decryption in reverse order of construction, i.e., $K_{n+1}$ is used to decrypt the TESLA signature of the message associated with $K_N$ to authenticate the message. Furthermore, it is infeasible to derive $K_i$ from $K_j$ where j is less than i. As such, it is computationally infeasible to generate a bogus hash chain.

Figure 4:
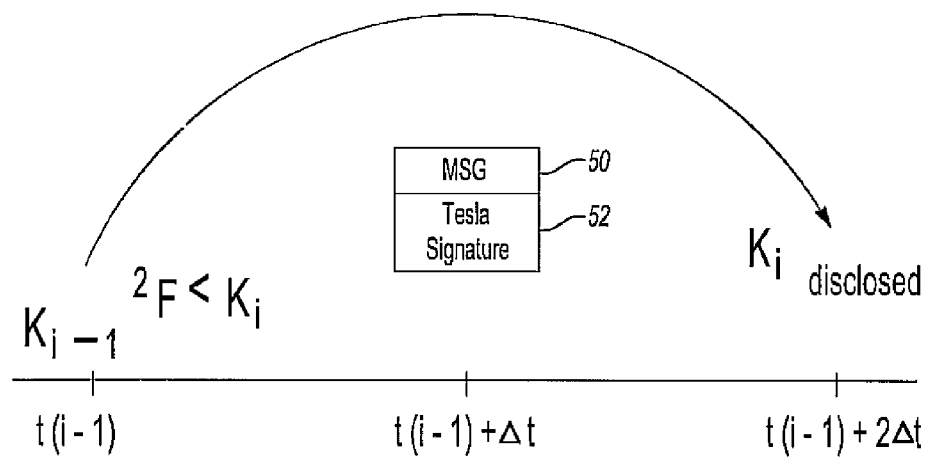
FIG. 4 is a diagrammatic view illustrating TESLA encryption.
Figure 7:
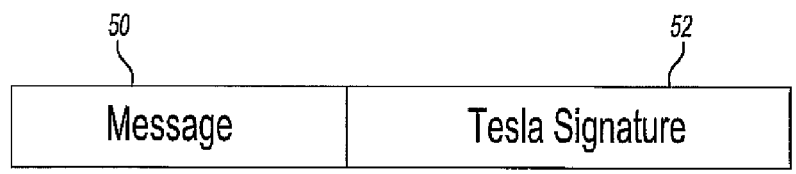
FIG. 7 illustrates an exemplary TESLA message packet.

With reference now to FIGS. 4 and 7, the mechanism for authenticating messages 50 having a TESLA encrypted signature 52 is illustrated. First, the TESLA signature 52 is formed by concatenating the message with the current hash chain key $K_{i-1}$ and then encrypting the result with the next key $K_i$ in the hash chain at time $t_{i-1}$. Thereafter, at time $t_{(i-1)}+\Delta t$ the message 50 together with the TESLA encrypted signature 52 is transmitted by the node. At this time, however, the TESLA signature 52 cannot be decrypted nor can the message 50 be authenticated since the decryption key $K_i$ is unknown.

At time $t_{(i-1)}+2\Delta t$ the decryption key $K_i$, i.e. the next value in the hash chain, is transmitted by the node together with the next message. The key $K_i$ is then used to decode or decrypt the TESLA encrypted signature 52 and, in doing so, authenticate the contents of the message 50. Such authentication occurs by comparing the decrypted TESLA signature with the hash function result of the message 50. Furthermore, after such use, the key $K_i$ is released so that it may not be reused.

Figure 5:
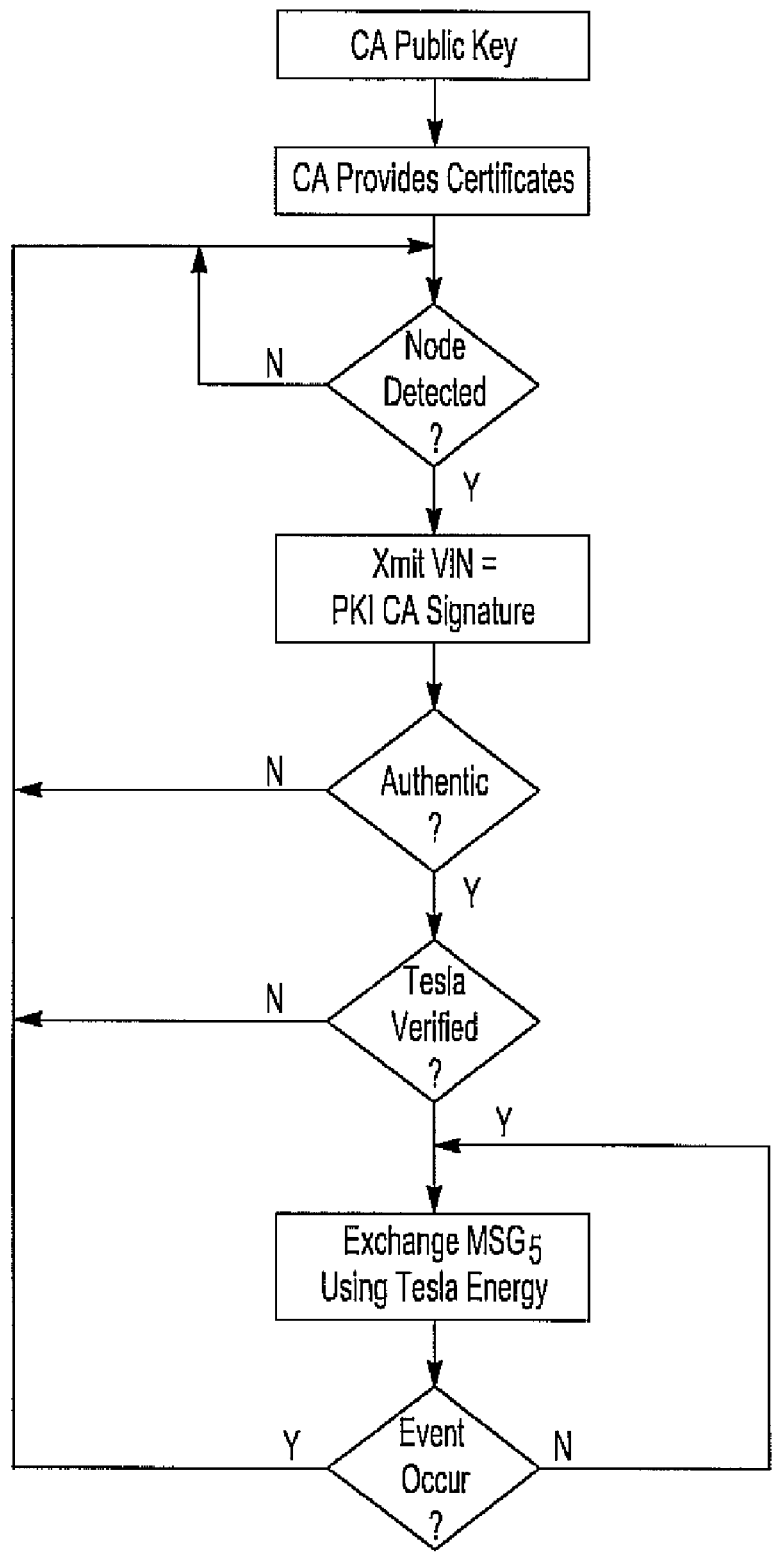
FIG. 5 is a flowchart illustrating the operation of the present invention.

With reference now to FIG. 5, the operation of the method of the present invention will now be summarized. At step 100, the public key for the certificate authority is freely distributed to all vehicles or nodes that are either in the ad hoc network or may become in the ad hoc network. Step 100 then proceeds to step 102. At step 102, the certificate authority assigns certificates which bind the node identifiers, such as a vehicle identification number and node public key, to the node and provides the certificates to the various nodes in the fashion previously described. Since the node identification numbers will be different for each node, each certificate provided by the certificate authority at step 102 will be different for each different node. Step 102 then proceeds to step 104.

At step 104, one node (referred to herein as the primary node for ease of explanation) determines if another node (referred to as a secondary node for ease of explanation) has been detected. If not, step 104 merely branches back to itself until a secondary node is detected.

Once detected, step 104 instead branches to step 106 where the primary node transmits its message, typically the vehicle identification number and public key, together with the PKI certificate from the certificate authority to the secondary node. Step 106 then proceeds to step 108 where the primary node receives the corresponding information from the secondary node in the form of a data packet. Step 108 then proceeds to step 110.

At step 110, the primary node decrypts the received data packet at step 108 by decrypting the signature of the received signal using the public key from the certificate authority and comparing that result with the result of a hash function applied to the message. If these two values match, the message is authentic and uncorrupted and simultaneously the certificate authority has vouched that the information transmitted by the secondary node is reliable or trustworthy. Thus, in that event step 110 proceeds to step 111. Otherwise, indicating that the message has been corrupted or that the certificate authority does not vouch for the reliability of the message received by the primary node, step 110 instead branches back to step 104 where the node transmission is disregarded and the above process is repeated.

At step 111 the nodes exchange the TESLA parameters, the root $K_0$ of the hash chain and the TESLA signature. Upon verification of the TESLA signature, step 111 proceeds to step 112 and otherwise back to step 104.

At step 112, the nodes exchange information via wireless communication utilizing messages with TESLA signature encryption using the hash chain keys previously described. Step 112 then proceeds to step 114 where the algorithm determines if a predefined event, such as the elapse of a predetermined time period such as one second to prevent excessive transmissions of the PKI and TESLA certificates, a new node appearing in the ad hoc network, etc. has occurred. If not, step 114 branches back to step 112 where communication between the nodes using TESLA signature encryption continues. However, after the predetermined event is encountered, step 114 proceeds back to step 104 where the above process is repeated.

Once the hash chain is exhausted, a new hash chain is created and the exchange of messages resumes beginning at the exchange of the TESLA parameters at step 111.

From the foregoing, it can be seen that the method of the present invention provides a robust yet efficient system for security authentication of messages in an ad hoc network, such as a vehicular ad hoc network. In particular, since PKI encryption employed for the certificate authority signature is bound to the vehicle identification information, it is computationally infeasible to determine the private key for the node from the PKI encrypted signature thus providing robust, albeit it computationally costly, authentication of the identity and reliability of the node.

However, once the node is identified as not only valid, but also reliable or trustworthy, TESLA encrypted signature security is then used for authentication of the messages exchanged between the nodes until a predetermined event, such as the detection of a new node or the elapse of a predetermined time period, occurs. TESLA encryption is much more computationally efficient, thus requiring significantly less computational power and bandwidth than PKI encryption. Consequently, PKI encryption is first used to verify not only the identity of the node, but also the trustworthiness or the reliability of the information transmitted by the node. Once that has been authenticated, data with TESLA encryption may then be used for the rapid and efficient exchange of information between the nodes in the ad hoc network.

Having described our invention, many modifications thereto will become apparent to those skilled in the art to which it pertains without deviation from the spirit of the invention as defined by the scope of the appended claims.

We claim:

1. A method for exchanging messages containing reliable information between nodes in a vehicle ad hoc network comprising the steps of:
   (a) initially providing a public key from a certificate authority for a PKI encrypted certificate authority signature to all nodes in the vehicle ad hoc network,
   (b) providing a private key from the certificate authority for a PKI encrypted certificate authority signature to all nodes known to transmit reliable information, (c) each node transmitting a signal containing node identification information and the PKI encrypted certificate authority signature associated with that node, (d) each node receiving said signals from the other nodes, (e) each node decrypting the certificate authority signatures received from the other nodes by using the public key to ascertain the authenticity of the received certificate authority signatures, (f) thereafter said nodes receiving and authenticating messages with a timed efficient stream loss tolerant authentication encrypted signature only with nodes identified to have an authentic certificate authority signature until the occurrence of a subsequent predefined event, said certificate authority revoking the public key for any node identified as transmitting improper messages so that all subsequent timed efficient stream loss tolerant messages transmitted by said node transmitting improper messages are ignored by other nodes in the vehicle ad hoc network.

2. The invention as defined in claim 1 wherein said subsequent event comprises a new node joining the ad hoc network.

3. The invention as defined in claim 1 wherein said subsequent event comprises the elapse of a predetermined time period from step (c).

4. The invention as defined in claim 1 wherein said subsequent event comprises the elapse of a predetermined time period from step (c) and a new node joining the ad hoc network.

5. The invention as defined in claim 1 and comprising the steps of repeating step (c) through step (f) after the occurrence of said predefined event.

6. The invention as defined in claim 1 and comprising the step of releasing the authenticity of the timed efficient stream loss tolerant authentication signature within a predefined time period following said receiving and accepting a message with the timed efficient stream loss tolerant authentication encrypted signature.

7. The invention as defined in claim 1 and further comprising the step of time synchronizing a clock to a transmission from a global positioning system to messages with timed efficient stream loss tolerant authentication encrypted signatures.

8. The invention as defined in claim 1 wherein said transmitting step comprises the step of transmitting a radio signal.

9. A method for exchanging messages in a vehicle ad hoc network containing reliable information between nodes in an ad hoc network in which each node is provided with a public key for a PKI encrypted certificate authority signature and in which each node known to transmit reliable information is provided with a private key PKI encrypted certificate authority signature, said method comprising the steps of:

(a) each node transmitting a signal containing node identification information and the PKI encrypted certificate authority signature associated with that node using a private key provided by a certificate authority, (b) each node receiving said signals from the other nodes, (c) each node decrypting the certificate authority signatures received from the other nodes by using the public key assigned by the certificate authority to ascertain the authenticity of the received certificate authority signatures, (d) thereafter said nodes receiving and authenticating messages with a timed efficient stream loss tolerant authentication encrypted signature only with nodes identified to have an authentic certificate authority signature until the occurrence of a subsequent predefined event, said certificate authority revoking the public key for any node identified as transmitting improper messages so that all subsequent timed efficient stream loss tolerant messages transmitted by said node transmitting improper messages are ignored by other nodes in the vehicle ad hoc network.

10. The invention as defined in claim 9 wherein said subsequent event comprises a new node joining the ad hoc network.

11. The invention as defined in claim 9 wherein said subsequent event comprises the elapse of a predetermined time period from step (a).

12. The invention as defined in claim 9 wherein said subsequent event comprises the elapse of a predetermined time period from step (c) and a new node joining the ad hoc network.

13. The invention as defined in claim 9 and comprising the steps of repeating step (c) through step (i) after the occurrence of said predefined event.

14. The invention as defined in claim 9 and comprising the step of releasing the authenticity of the timed efficient stream loss tolerant authentication signature within a predefined time period following said receiving and accepting a message with the timed efficient stream loss tolerant authentication encrypted signature.

15. The invention as defined in claim 9 and further comprising the step of time synchronizing a clock to a transmission from a global positioning system to messages with timed efficient stream loss tolerant authentication encrypted signatures.

16. The invention as defined in claim 9 wherein said transmitting step comprises the step of transmitting a radio signal.

17. The invention as defined in claim 9 wherein said message contains information regarding the status of the node.

* * * * *